United States Patent [19]

Mills

[11] Patent Number: 5,101,552

[45] Date of Patent: Apr. 7, 1992

[54] CONDUIT COLLECTOR FEEDER

[75] Inventor: Jeffrey L. Mills, Collierville, Tenn.

[73] Assignee: Hex B Group, Ltd., Mt. Clemens, Mich.

[21] Appl. No.: 596,727

[22] Filed: Oct. 9, 1990

[51] Int. Cl.⁵ .............................................. B23P 21/00
[52] U.S. Cl. ......................................... 29/782; 29/779
[58] Field of Search ........................ 29/779, 781, 782

[56] References Cited

U.S. PATENT DOCUMENTS 3,858,731 1/1975 Briggs ................................... 29/781
4,017,955 4/1977 Hermanson et al. ............. 29/782 X
4,076,130 2/1978 Sumner ............................. 29/781 X
4,945,632 8/1990 Alman et al. .......................... 29/781

Primary Examiner—Timothy V. Eley
Attorney, Agent, or Firm—Harness, Dickey & Pierce

[57] ABSTRACT

A collector feeder has a mechanism for receiving a plurality of ducts into the collector feeder, a mechanism for directing the conduits toward one another to couple adjacent conduits with each other, and an exit enables the plurality of ducts to exit the collector feeder as an assembled multi-cell single conduit unit.

18 Claims, 5 Drawing Sheets

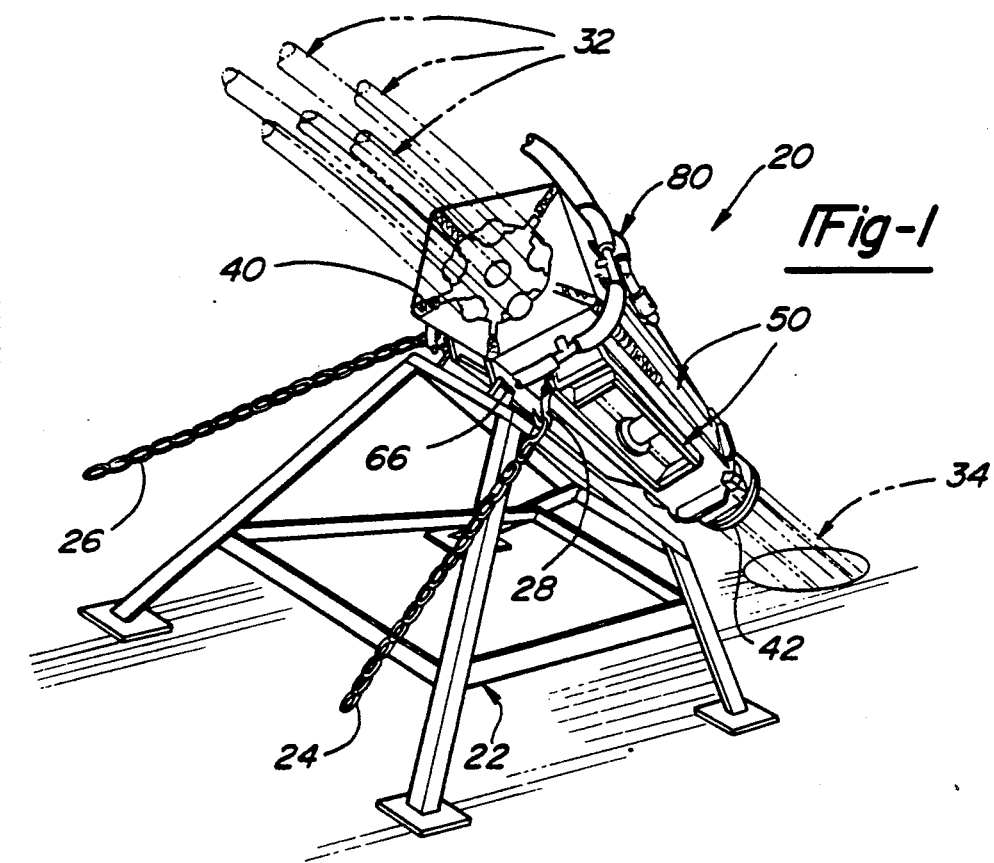
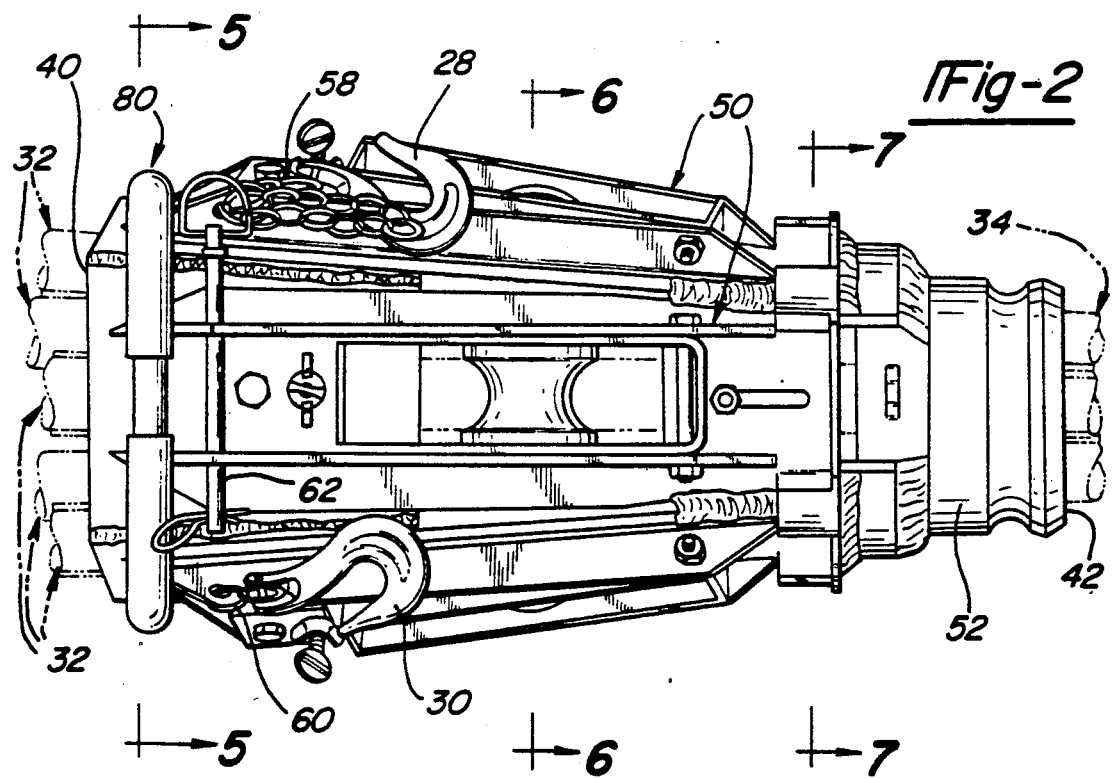

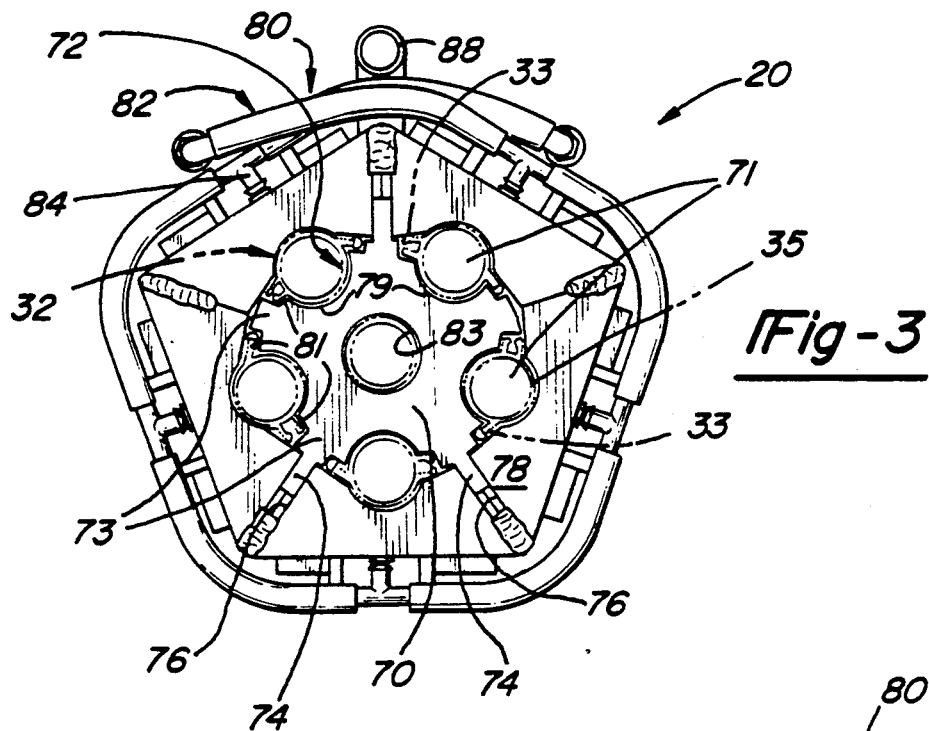

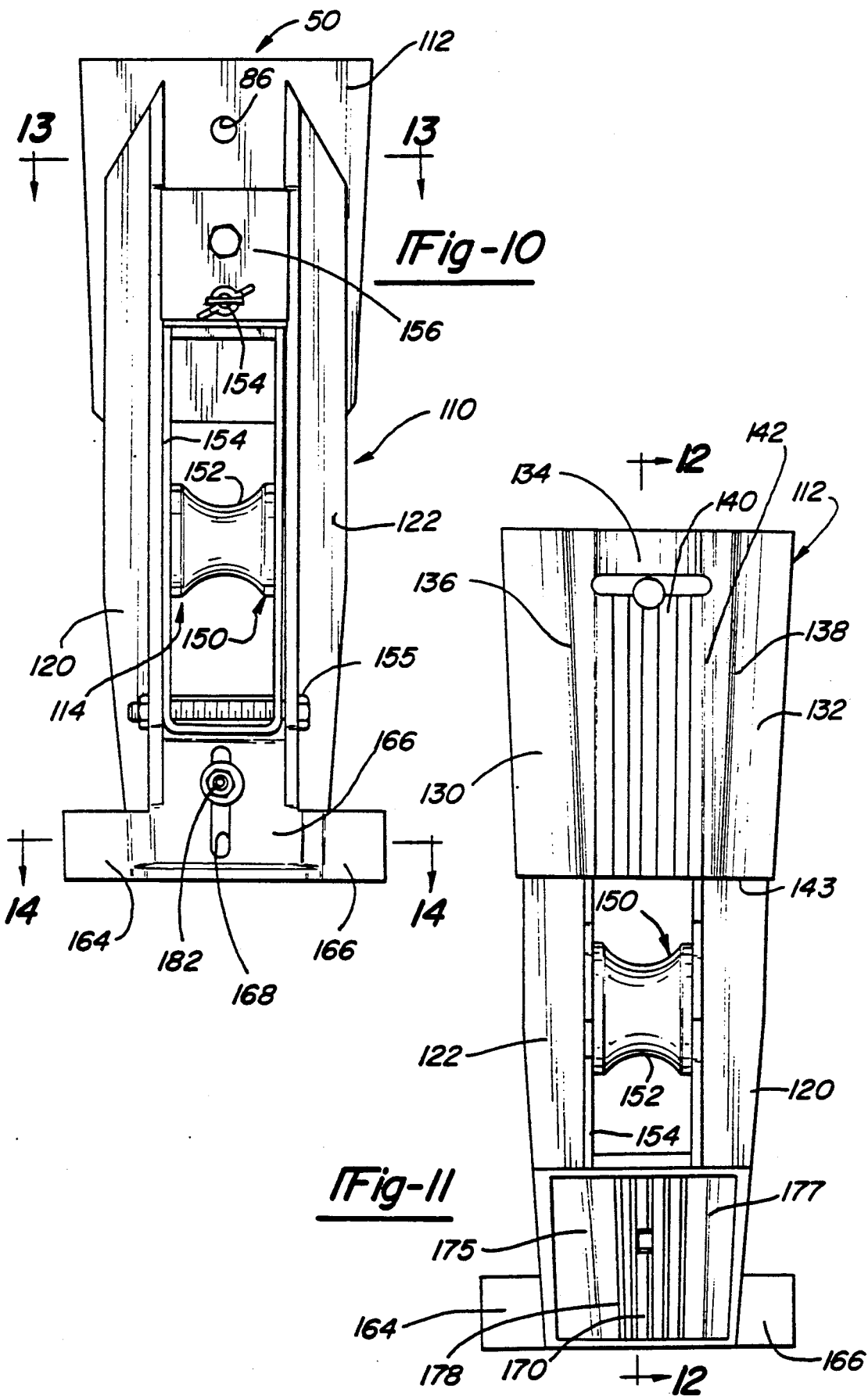

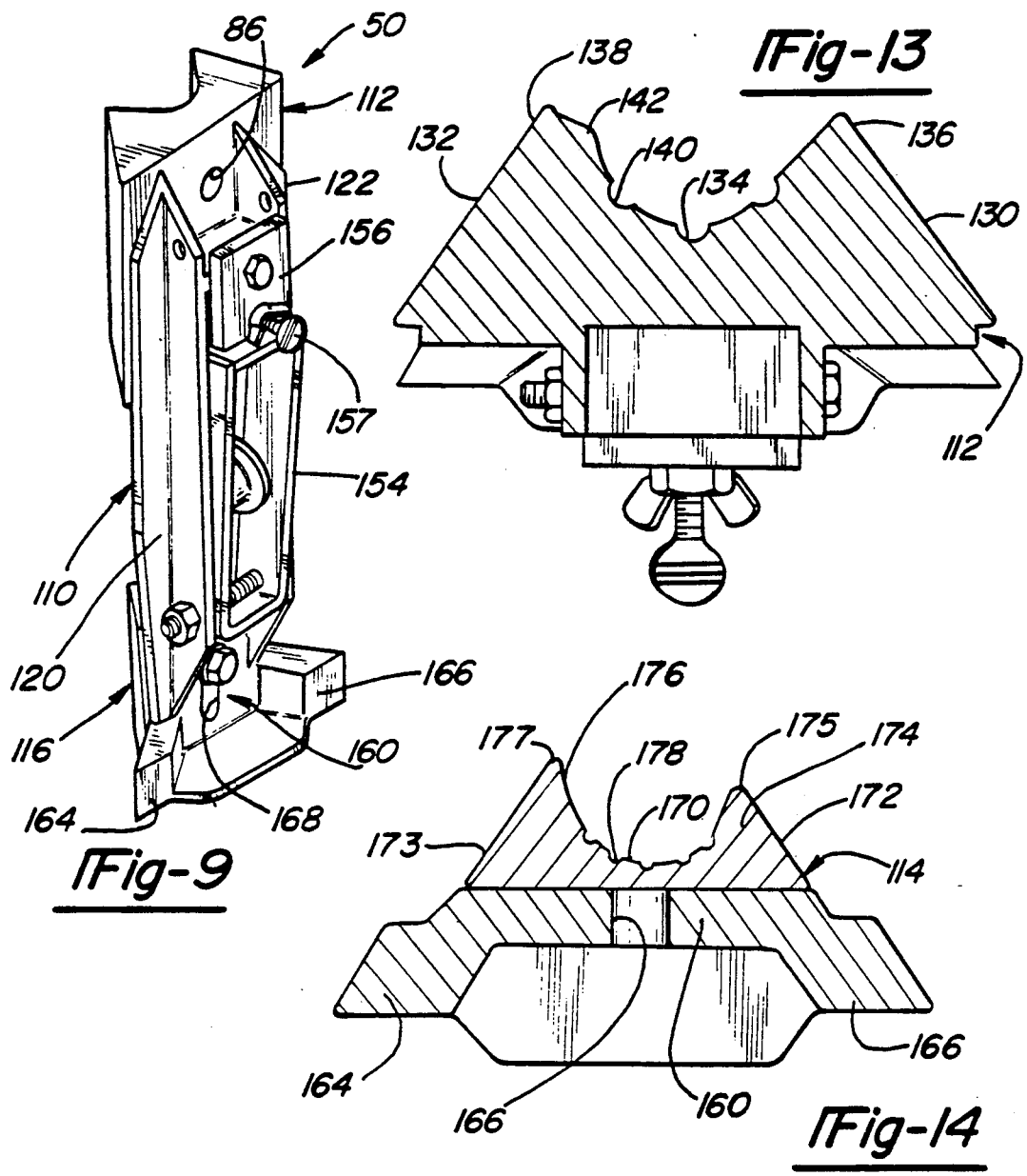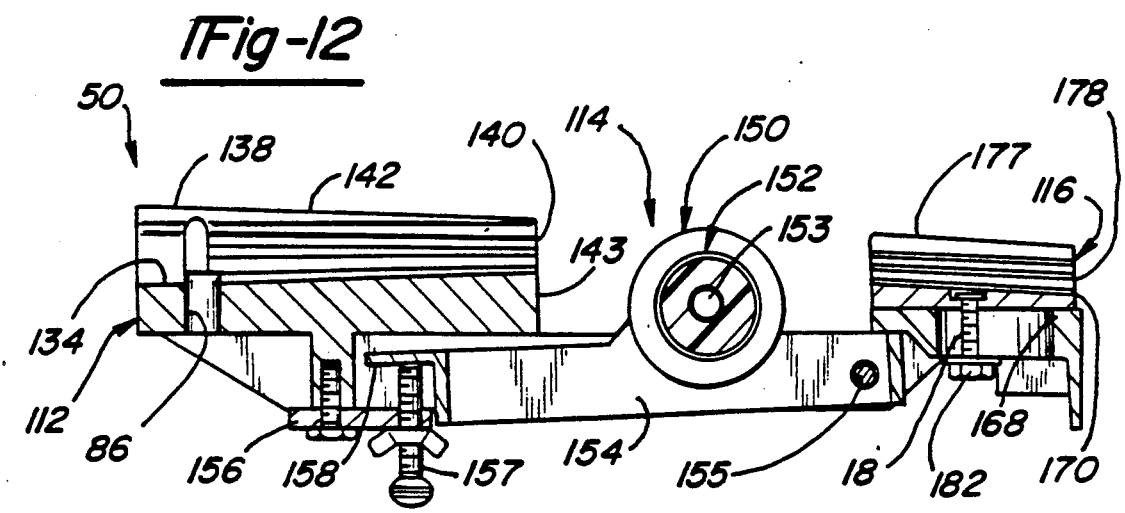

CONDUIT COLLECTOR FEEDER

BACKGROUND AND SUMMARY OF THE INVENTION

The present invention relates to cable installation and, more particularly, to an apparatus which combines mutiple connectable ducts into a single conduit unit with multiple cell ducts for placement into existing underground conduits or for new construction underground plants.

Placement of cable underground has been popular for many years. Generally, electrical or communication lines, such as telephone, have been run underground for many years. Generally, these power and/or communication lines are positioned in oversized conduits for protection and support. Thus, several major cities, as well as other areas, have miles miles of existing underground conduit.

With the advent of fiber optic cable, the use of copper cable for communications is becoming obsolete. One advantage fiber optic cable provides is that it is a fraction of the diametric size of comparable copper cable. Thus, it is possible to position more fiber optic cables than copper cables in existing underground conduits.

With the deregulation of the communications industry, several companies have entered the communication carrier field. To compete, these companies need their own transmission cables to be competitive. The expense of laying new underground cable in existing cities is cost prohibitive. Thus, it is desirable to be able to position as many cables as possible in existing underground conduits.

One such device that provides a single conduit unit having multiple ducts which may be placed in existing underground conduits is illustrated in U.S. Pat. No. 4,804,020, issued Feb. 14, 1989, entitled "Conduit Liner Assembly and Method for Installation", the specification of which is herein expressly incorporated by reference. This patent illustrates a plurality of ducts or liners assembled together as a single conduit unit by a connecting means. The ducts or liners may move independently with respect to one another and are capable of being adapted to fit within existing underground conduits. Thus, the single conduit unit provides a plurality of cells within the underground conduits to enable positioning of a plurality of discrete cables into existing underground conduits.

The present invention provides the art with a device which receives a plurality of ducts and assembles them into a mutli-cell conduit unit. The assembly of the ducts substantially eliminates spiralling in the single multi-cell conduit unit. The present invention provides lubrication during assembly of the plurality of ducts to aid in connecting the ducts with one another.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 is a perspective view of a collector feeder in accordance with the present invention with ducts illustrated in phantom.

FIG. 2 is a side elevation view of the collector feeder of FIG. 1.

FIG. 3 is an end elevation view of the collector feeder of FIG. 1.

FIG. 4 is the other end elevation view of the collector feeder of FIG. 1.

FIG. 5 is a sectional view taken along line 5—5 of FIG. 2.

FIG. 9 is a perspective view of an individual panel member of the collector feeder of FIG. 1.

FIG. 10 is a bottom plan view of the panel of FIG. 9.

FIG. 11 is a top plan view of the panel of FIG. 9.

FIG. 12 is a sectional view taken along line 12—12 of FIG. 11.

FIG. 13 is a sectional view taken through line 13—13 of FIG. 10.

FIG. 14 is a sectional view taken through line 14—14 of FIG. 10.

DETAILED DESCRIPTION OF THE PREFERRED EMBODIMENT

Figure 6:
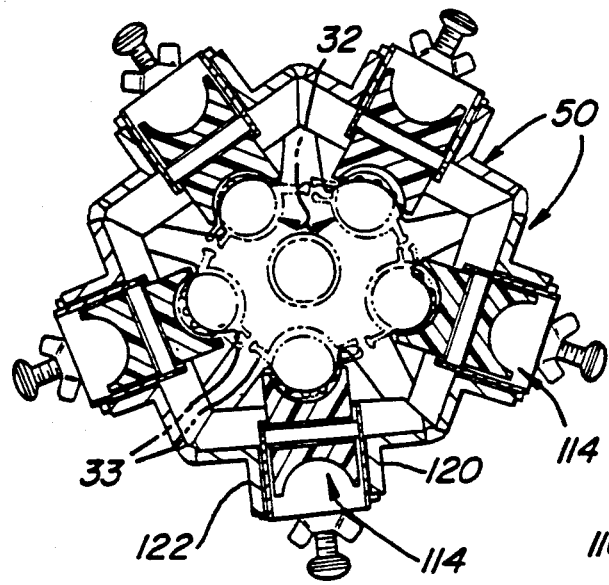
FIG. 6 is a sectional view taken along line 6—6 of FIG. 2.

Turning to the figures, particularly FIG. 1, a collector feeder is shown and designated with the reference numeral 20. The collector feeder 20 is ordinarily mounted on a support frame 22 to position the collector feeder 20 off the ground. Generally, chains 24 and 26 are coupled with hooks 28 and 30 on the collector feeder 20 to stabilize the collector feeder 20 during operation. The collector feeder 20 receives a plurality of ducts 32 from individual spools (not shown). The ducts 32 enter the collector feeder 20 and are coupled with one another into a multi-cell conduit unit 34. The multi-cell conduit unit 34 may be planted directly into the earth, or may be positioned into existing conduits.

The collector feeder 20 has an overall elongated wedge shape tapering from the receiving end 40 towards the exiting end 42 and defining a tapered tunnel within the collector feeder 20. The collector feeder 20 is comprised of a plurality of substantially identical panel members 50 which are permanently affixed to one another by a welding process or the like to form the collector feeder 20. The collector feeder 20 includes a male clamp lock coupling 52 at the exit end 42 to enable optional coupling of the collector feeder 20 with a conduit coupling or the like. Chain hooks 28 and 30 are secured by links 58 and 60 to the panels 50, as seen in FIG. 2. Also, a mounting pin 62 may be associated with one of the panels 50 to couple the collector feeder 20 with the frame 22.

The panels 50 are positioned adjacent one another and permanently affixed together to form a cylinder defining a tapered tunnel with a closed geometrical configuration or shape in end elevation, as illustrated in FIGS. 1-7. In the embodiment shown, the collector feeder 20 has a pentagonal shape in end elevation, being formed of five panel members 50. The collector feeder 20 could be formed of three, four, six or more panels 50 providing a triangular, rectangular, hexagonal or the like geometric configuration in end elevation. Also, the panels may be modified to provide a circular configuration in end elevation.

A template or center block 70 is illustrated dividing the tunnel opening of the collector feeder 20 into individual duct receiving receptacles 71. The template or center block 70 has an overall star shape with the vertices 73 separated by channels 72. The channels 72 cooperate with panels 50 to correspond in configuration with the ducts 32 to discreetly position each duct 32 in a separate entrance receiving receptacle 71 as the ducts 32 are received by the collector feeder 20, as seen in FIGS. 1, 3 and 5. Generally, several of the vertices 73 include extending portions 74 which mate with slots 76 in the face 78 of the receiving end 40 of the collector feeder 20 to enable proper orientation of the template or center block 70 within the receiving end 40 of the collector feeder 20, as best seen in FIG. 3. Generally, the channels 72 in the template 70 are substantially identical, having an arcuate surface portion 79 flanked on its sides by flat surface portions 81. The flat surface portions 81 seat the interconnecting member 33 of the ducts 32 and the arcuate surface portion 79 seats the body 35 of the ducts 32. Also, the template or center block 70 may include a central bore 83 to receive an additional duct. The bore 83 may be of any desired configuration and is shown as being circular.

A lubrication mechanism 80 is coupled with the collector feeder 20 near the receiving end 40. The lubrication mechanism 80 includes a lubrication manifold 82 including a plurality of extending fitting members 84 which secure within apertures 86 in panels 50 adjacent to receiving end 40 of the collector feeder 20, as seen in FIG. 3. Conduit 88 is coupled with a device (not shown) which provides lubricant to the lubricating manifold 82. The lubricant enables the ducts 32 to easily interconnect with one another and to move through the collector feeder 20.

As the ducts 32 are received at the receiving end 40 of the collector feeder 20, they are individually discretely positioned into the duct receiving receptacles 71, as illustrated in cross-section by FIG. 5. As the ducts 32 move further into the collector feeder 20, the ducts 32 begin to join with one another in the tunnel within the collector feeder 20, as illustrated in phantom in FIG. 6. As the ducts 32 move further through the collector feeder 20, they are joined at their connection members 33 into a multi-cell single conduit unit 34, as illustrated in phantom in FIG. 7. Thus, the size and taper of the tunnel along with the panel members 50 enable the ducts 32 to pass into the collector feeder 20 as individual ducts and become joined together within the collector feeder 20 to exit the collector feeder 20 as a multi-cell single conduit unit 34 which may be laid directly into the earth or may be passed or directed into a conduit.

Figure 8:
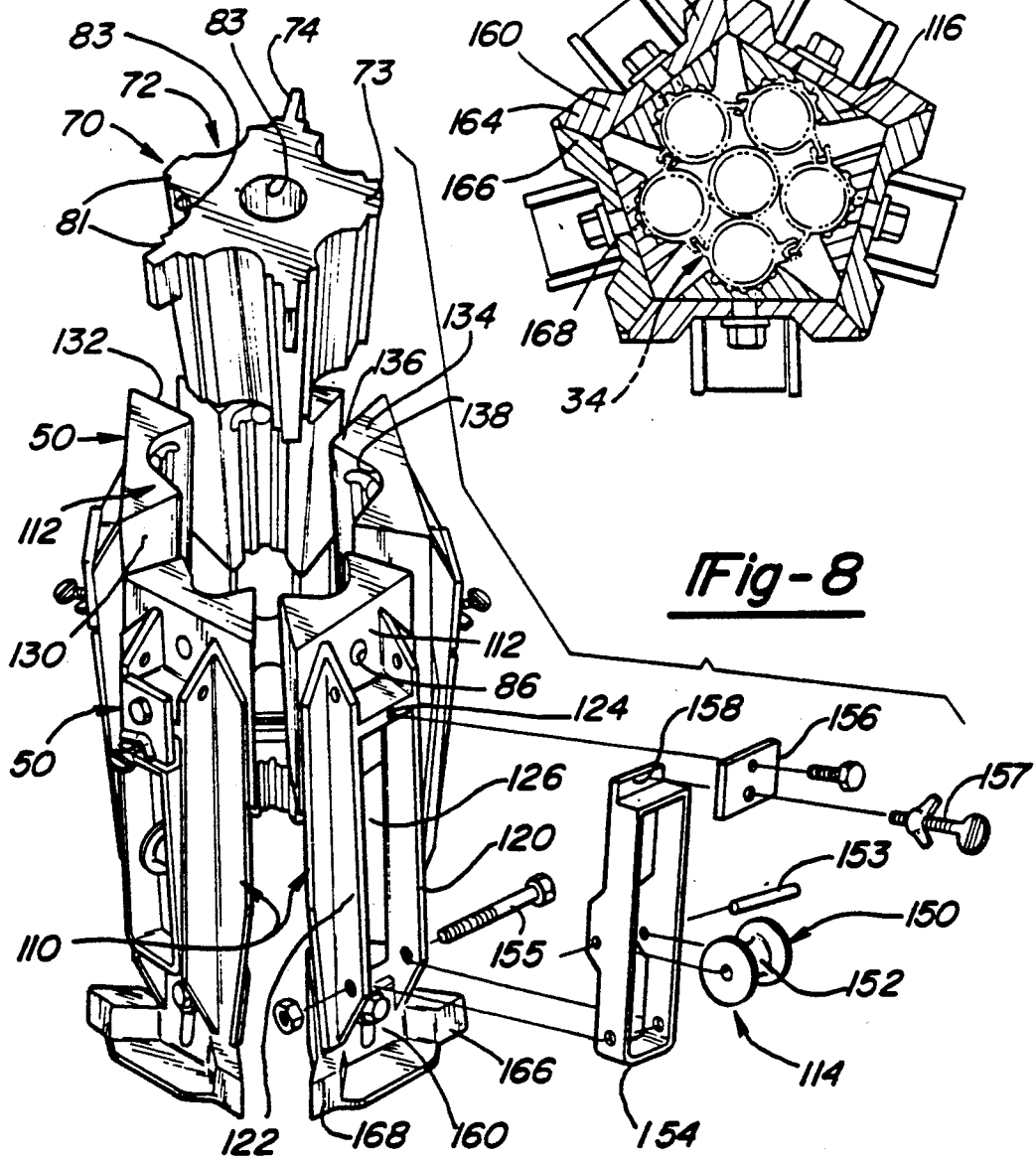
FIG. 8 is an exploded perspective view of the feeder collector of FIG. 1.

Turn to FIGS. 8–14 for a better understanding of the individual panels 50. FIG. 8 illustrates an exploded view of the individual panels 50 of the collector feeder 20. The panels 50 are generally elongated, including a frame 110, a first block member 112, a movement mechanism 114 and a second block member 116. The panels 50 work with adjacent panels to couple the ducts 32 with one another, as previously explained.

The frame 110 includes a pair of legs 120 and 122 separated by a bridge member 124 near one of their ends. The legs 120 and 122 are generally L-shaped in cross-section and are spaced with respect to one another by the bridge member 124 to provide a gap 126 between them. A plate 160 is at the other end of legs 120 and 122 of the frame 110. The plate 160 includes a pair of tabs 164 and 166 that are machined to desired angles to enable positioning with adjacent panels 50. A slot 168 is formed in the plate 160 to enable axial positioning of the second member 116 on the plate 160.

The first member 112 has an overall rectangular block shape and is positioned at the receiving end of the panel 50. The member 112 is integrally formed with the frame 110. The member 112 has angled side walls 130 and 132 to enable abutment with adjacent panels 50 to provide for a number of different closed geometric configurations when the panels are affixed with one another. A channel 134 is formed axially in the block member 112. The channel 134 divides the block member into two triangular-shaped peaks 136 and 138 separated by the arcuate valley channel 134. The block member 112 has additional grooves 140 continuous with the channel 134 in the block member 112. The grooves 140 enable lubricant to flow to enable lubricant to be present on the block surface. A ridge 142 extends from the block member 112 into channel 134 to provide a seating surface for one of the connecting members 33 of the ducts 32. The ridge 142 extends angularly upward from receiving end of the block member 112 towards the exit end 143 of the block member 112 such that the height of the ridge 142, with respect to the surface of the channel 134, increases from the receiving end to the exit end 143, as seen in FIG. 12. Also, the thickness of the block member 112 at the bottom of the channel 134 increases from the receiving end towards the exit end 143 of the panel, as seen in FIG. 12. When combined with adjacent panel members, the block members 112 urge the ducts 32 closer toward one another as the ducts are passed through the collector feeder 20.

Movement mechanism 114, which generally comprises a roller 150 and roller cage 154, is positioned in gap 126 in between the legs 120 and 122 of the frame 110. The roller 150 is allowed to freely spin within the gap 126. The roller 150 includes an arcuate groove 152 for contacting the body 35 of the ducts 32. A pin 153 secures the roller 150 to the cage 154. The cage 154 provides the roller 150 with pivotal movement with respect to the panel 50, as seen in FIG. 12. As the cage 154 pivots, the roller 150 may be moved up and/or down with respect to the channel 134 to provide force onto ducts 32 as they pass by the roller 150, as seen in FIG. 6. The roller 150 may be in alignment with the channel 134 or may be moved out of alignment with the channel 134 such that the roller applies more or less force on the ducts 32 as the ducts 32 contact the roller 150 to move the ducts 32 further inward to connect with one another. The cage 154 further includes a pivot pin 155 providing pivotal movement of the cage 154 and an adjustment plate 156 and screw 157 for adjusting the desired position of the roller 150 and cage 154 on the panel 50, as seen in FIG. 12. The cage 154 has a tail 158 which contacts screw 157 for adjusting the cage 154.

Figure 7:
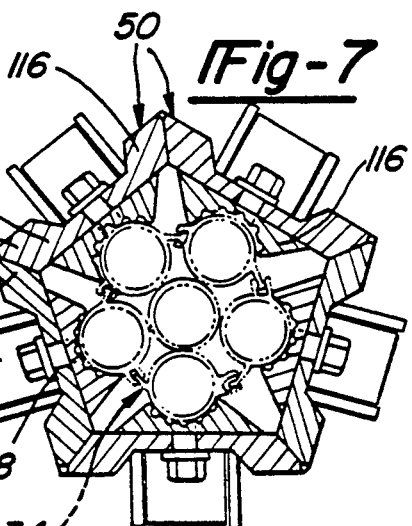
FIG. 7 is a sectional view taken along line 7—7 of FIG. 2.

The second block member 116 has an overall rectangular shape with angled sidewalls 172 and 173 to enable abutment with adjacent panels 50 to form the closed configuration collector feeder 20. An arcuate channel 170 divides the block member 116 into a pair of peaks 174 and 176. The channel 170 has a plurality of deeper grooves 178 on the block surface to enable the lubricant to lubricate the block surface. Also, peak 176 is taller than the peak 174. The apexes 175 and 177 of the peaks 174 and 176 provide a seating surface for the connecting member 33 of the ducts 32 as they connect together, as seen in FIG. 7. Thus, the arcuate bodies 35 of the ducts 32 ride in the channel 170 while the connecting members 33 ride upon the apexes 175 and 177 of the peaks 174 and 176 of the second block member 116.

The thickness of the block 116 at the entrance end 178 of channel 170 decreases toward the exit end 179 of the block member 116, as seen in FIG. 12. Thus, the ducts 32 are squeezed and connected together as they exit the roller 150 and enter the second block 116 enabling the ducts 32 to snap together with one another. The block member 116 is axially adjustable along the plate 160 via slot 168. A bolt 180 and nut 182 provide the securement of the block member 116 onto the plate 160 and provide for the axial movement of the block member 116.

The panels 50 may be combined together by welding or the like with one another so that they form a closed geometric configuration collector feeder 20 and so a number of ducts 32 may be received by the collector feeder 20 and exit as a multi-cell single conduit unit. The present invention can be formed or cast as a unitary closed geometric figure casting.

While the above detailed description provides a preferred embodiment of the present invention, it will be understood that the present invention is susceptible to modification, alteration and change without deviating from the scope and spirit of the subjoined claims.

I claim:

1. A duct collector feeder for receiving a plurality of ducts and joining them as a multi-cell single conduit unit comprising:
   means for receiving a plurality of discrete ducts with connector means for connecting with adjacent ducts;
   means for directing said plurality of ducts toward one another such that the duct connecting means interconnect adjacent ducts, said directing means cooperating with said receiving means; and
   exit means for enabling said plurality of ducts to exit said feeder as an assembled multi-cell single conduit unit, said exit means cooperating with said directing means.

2. The collector feeder according to claim 1 wherein said receiving means, directing means and exit means form a tunnel tapering in size from said receiving means toward said exit means.

3. The collector feeder according to claim 1 wherein said receiving means further comprises a member having a closed geometric shape with a plurality of receiving members corresponding in number to the plurality of ducts, and a template adapted to be positioned with respect to said plurality of receiving member such that said template aligns said plurality of ducts with said receiving members for enabling passage of the ducts through the collector feeder.

4. The collector feeder according to claim 1 wherein said directing means further comprises a member having a closed geometric shape, a means for enhancing movement of said plurality of ducts through the collector feeder, and a plurality of receiving members in said member corresponding in number to the plurality of ducts.

5. The collector feeder according to claim 1 further comprsies means for lubricating said plurality of ducts, said lubricating means cooperating with said receiving means.

6. A conduit collector feeder comprising:
   a plurality of collector panels positioned and affixed with respect to one another to form a tunnel with a closed geometric shape in end elevation, said collector panels being elongated and tapered, and each collector panel including a receiving member adapted to receive a duct and means for enhancing movement through said tunnel and applying a force on the ducts to interlock the ducts one to another; and
   template means adapted for aligning the ducts with said receiving members for passing the plurality of discreet ducts into the collector panels and where upon exit of the collector panels said plurality of ducts are assembled as a multi-cell single conudit units.

7. The collector feeder according to claim 6 wherein said receiving members include a block formed on said panel, said block having an axial channel for receiving a duct.

8. The collector feeder according to claim 6 wherein said means for enhancing movement and applying force includes a roller and cage to provide adjustment of said roller, and a block on said panel having an axial channel to force adjacent conduits to interlock one to another.

9. The collector feeder according to claim 6 further comprising means for lubricating ducts entering into said tunnel, said lubricating means coupled with said receiving member.

10. The collector feeder according to claim 6 wherein said template has an overall star configuration with portions between adjacent vertices being adapted to receive a portion of a duct.

11. The collector feeder according to claim 10 wherein said template has a bore through its center enabling passage of a duct.

12. A collector panel for a conduit collector feeder comprising:
    an elongated frame having two ends;
    a first member integral with said frame at one of its ends, said first member defining a channel adapted to receive a duct;
    a roller associated with said frame and axially aligned with said channel, said roller adapted to contact a duct; and
    a second member on said frame at its other end; said second member including a channel adapted for receiving a duct, said second member channel axially aligned with said first member channel.

13. The collector panel according to claim 12 wherein said second member is axially adjustable on said frame.

14. The collector panel according to claim 12 wherein said roller is on a pivotally adjustable cage.

15. The collector panel according to claim 12 wherein said first member channel tapers from one end to its other, wider to narrower and decreases in depth in the same direction.

16. The collector panel according to claim 15 wherein a ridge is formed in said channel and is angled upwardly in the direction from the wider end to the narrower end along said channel.

17. The collector panel according to claim 15 wherein said second member channel increases in depth from one end to its other.

18. The collector panel according to claim 12 wherein said channel divides said second member such that a pair of peak members are formed on each side of said channel, one of said peak members being taller than the other.

* * * * *